United States Patent
Charraud et al.

(10) Patent No.: US 11,521,013 B2
(45) Date of Patent: Dec. 6, 2022

(54) SYSTEMS AND METHODS FOR PROVIDING PERSONALIZED PRODUCT RECOMMENDATIONS USING DEEP LEARNING

(71) Applicant: L'Oreal, Paris (FR)

(72) Inventors: Grégoire Charraud, Clichy (FR); Helga Malaprade, Clichy (FR); Géraldine Thiebaut, Clichy (FR); Matthieu Perrot, Clichy (FR); Robin Kips, Clichy (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 17/317,742

(22) Filed: May 11, 2021

(65) Prior Publication Data

US 2021/0264204 A1 Aug. 26, 2021

Related U.S. Application Data

(62) Division of application No. 16/171,153, filed on Oct. 25, 2018, now Pat. No. 11,010,636.

(51) Int. Cl.
*G06K 9/62* (2022.01)
*G06V 10/40* (2022.01)
(Continued)

(52) U.S. Cl.
CPC ......... *G06K 9/6256* (2013.01); *G06K 9/6262* (2013.01); *G06V 10/40* (2022.01); *G06V 40/171* (2022.01); *G06V 30/10* (2022.01)

(58) Field of Classification Search
CPC ............... G06K 9/6256; G06K 9/6262; G06K 9/00281; G06K 2209/01; G06K 9/46; G06K 9/00; G06K 9/62
See application file for complete search history.

(56) References Cited

U.S. PATENT DOCUMENTS

2018/0075523 A1* 3/2018 Sartori Odizzio .... G06F 16/435
2018/0197223 A1* 7/2018 Grossman .......... G06Q 30/0621
2019/0362134 A1* 11/2019 Kim .......................... G06T 7/00

FOREIGN PATENT DOCUMENTS

JP 2018092614 A 6/2018
JP 2018132821 A 8/2018
(Continued)

OTHER PUBLICATIONS

International Search Report and Written Opinion dated Jan. 28, 2020, issued in corresponding International Application No. PCT/EP2019/079036, filed Oct. 24, 2019, 13 pages.
(Continued)

*Primary Examiner* — Tuan H Nguyen
(74) *Attorney, Agent, or Firm* — Christensen O'Connor Johnson Kindness PLLC (57) ABSTRACT

Embodiments of the present disclosure provide systems, methods, and computer-readable media that use machine learning models to enable computing devices to detect and identify cosmetic products in face images. In some embodiments, a model training system may gather training data for building the machine learning models by analyzing face images associated with tagging data. In some embodiments, a recommendation system may be configured to use the machine learning models generated by the model training system to detect products in face images, and to add information based on the detected products to a look data store, and/or to provide recommendations for similar looks from the look data store based on the detected products.

19 Claims, 5 Drawing Sheets

(51) Int. Cl.
*G06V 40/16* (2022.01)
*G06V 30/10* (2022.01)

(56) References Cited

FOREIGN PATENT DOCUMENTS

| | | |
|---|---|---|
| WO | 2017/125975 A1 | 7/2017 |
| WO | 2018/143707 A1 | 8/2018 |

OTHER PUBLICATIONS

Office Action dated Jul. 25, 2022, in corresponding Japanese application No. JP2021522418A, filed May 2, 2019, 12 pages.

* cited by examiner

SYSTEMS AND METHODS FOR PROVIDING PERSONALIZED PRODUCT RECOMMENDATIONS USING DEEP LEARNING

CROSS-REFERENCE TO RELATED APPLICATION

This application is a division of U.S. application Ser. No. 16/171,153, filed Oct. 25, 2018, the entire disclosure of which is hereby incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of training a machine learning model to detect cosmetic products in a face image is provided. A computing device determines a product present in the face image based on non-image data. The computing device extracts a portion of the face image that includes a facial feature associated with the product. The computing device adds the portion of the face image and an identification of the product to a training data set. The computing device trains the machine learning model to detect the product in face images using the training data set.

In some embodiments, a method of using one or more machine learning models to process face images is provided. A computing device uses the one or more machine learning models to detect one or more products in a face image. The computing device determines one or more recommended looks based on the one or more products in the face image. The computing device determines one or more products associated with the one or more recommended looks. The computing device presents the one or more recommended looks or the one or more products to a user.

In some embodiments, a system for training a machine learning model to detect cosmetic products in a face image is provided. The system comprises circuitry for determining a product present in the face image based on non-image data; circuitry for extracting a portion of the face image that includes a facial feature associated with the product; circuitry for adding the portion of the face image and an identification of the product to a training data set; and circuitry for training the machine learning model to detect the product in face images using the training data set.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Often, consumers of cosmetic products will see pictures of people with looks—combinations of features that may include cosmetic products, clothes, hairstyles, and/or accessories—that they would like to emulate. However, these pictures are usually not labeled in any detailed way regarding what cosmetic products are being worn, and so the chances of another consumer being able to successfully reproduce the look are extremely low. It is desirable for consumers to have access to technology that would automatically determine one or more cosmetic products that are depicted in a picture. Such technology is desirable for other reasons, as well. For example, technology that provided computing devices with these new capabilities would also allow for the automatic building of collections of looks based on publicly available pictures that are augmented with detailed information about depicted products, and the using of such collections of data to determine looks similar to a given look.

Figure 1:
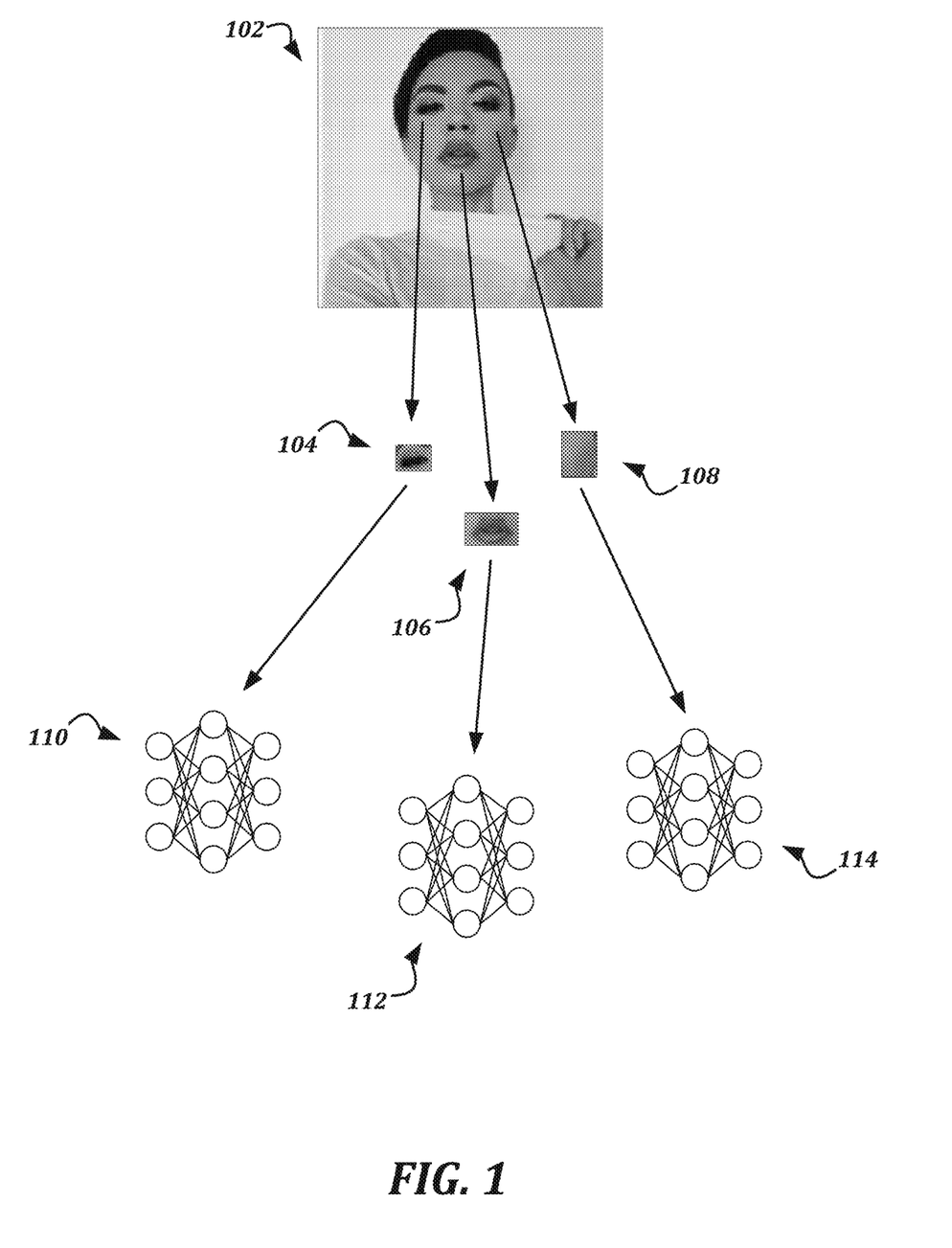
FIG. 1 is a schematic drawing that illustrates an example embodiment of logical processing of a face image according to various aspects of the present disclosure.

FIG. 1 is a schematic drawing that illustrates an example embodiment of logical processing of a face image according to various aspects of the present disclosure. A face image 102 is shown that depicts a face of a person wearing one or more cosmetic products. Computer vision techniques can be used to identify particular facial features within the face image, such as an eye, lips, a cheek, and eyebrows. Once the facial features are detected, portions of the face image 102 can be extracted. For example, an eye portion 104, a lips portion 106, and/or a cheek portion 108 may be extracted. The face image 102 may be associated with tagging information that identifies cosmetic products that are being worn in the face image 102. For example, the tagging information may identify a brand, color, texture, and/or finish of a lipstick being worn, an eyeshadow being worn, a blush being worn, and so on. Once the portions of the face image (e.g., the lip portion 106) is associated with the relevant product (e.g., the identified lipstick), the portion of the face image 106 and the product information can be added to a set of training data to be used to train a machine learning model 112. Each portion of the face image 104, 106, 108 may be added to separate training data sets to train respective machine learning models 110, 112, 114 for detecting products on the separate facial features.

Figure 2:
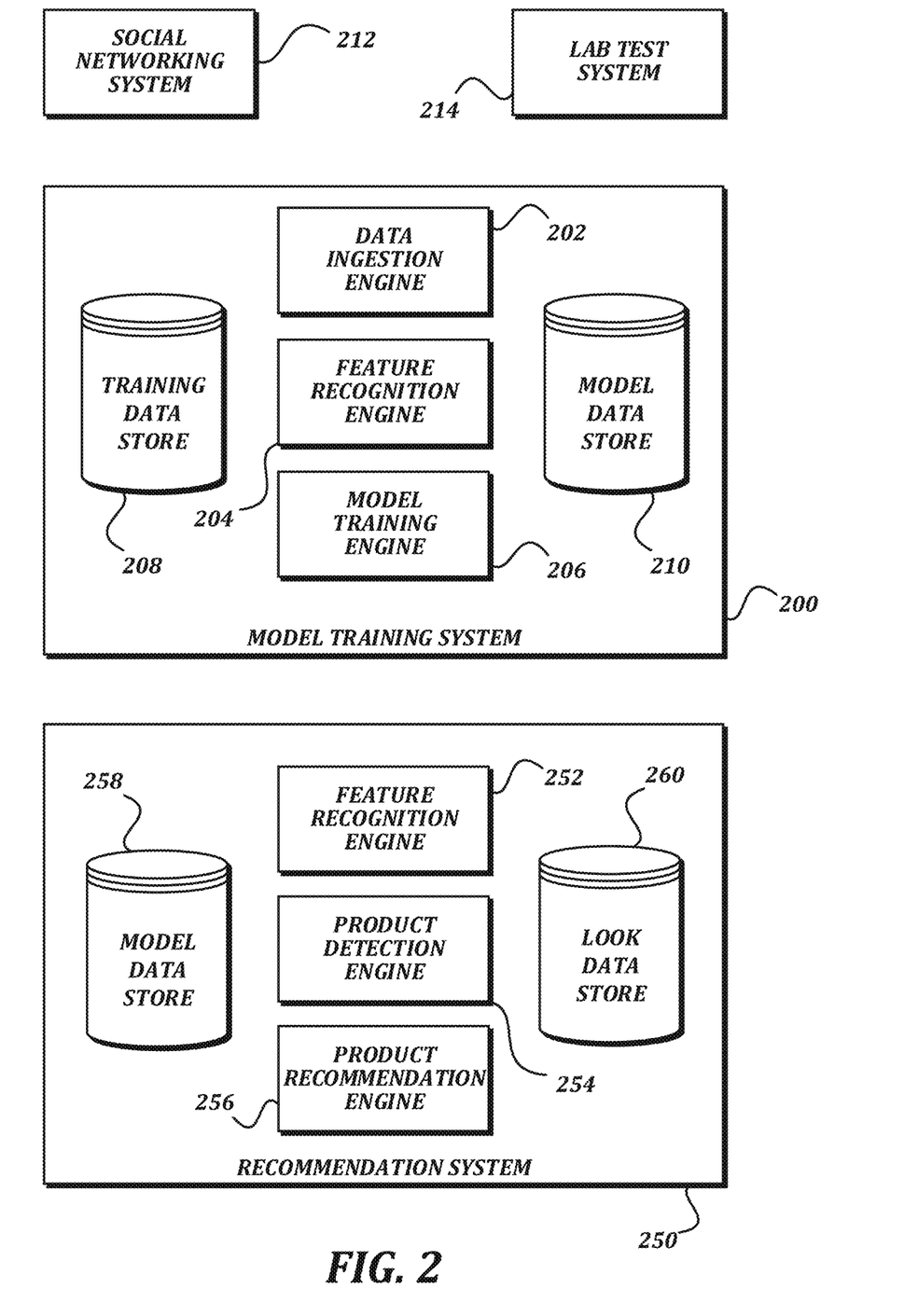
FIG. 2 is a block diagram that illustrates an example embodiment of a model training system and an example embodiment of a recommendation system according to various aspects of the present disclosure.

FIG. 2 is a block diagram that illustrates an example embodiment of a model training system and an example embodiment of a recommendation system according to various aspects of the present disclosure. In some embodiments, the model training system 200 is configured to collect face images, generate training data based on the face images, and train one or more machine learning models based on the training data. In some embodiments, the recommendation system 250 is configured to use the machine learning models generated by the model training system 200 to detect products in face images, and to add information based on the detected products to a look data store 260, and/or to provide recommendations for similar looks from the look data store 260 based on the detected products. In some embodiments, the model training system 200 and the recommendation system 250 may each be provided by one or more computing devices, and may communicate with each other using any suitable communication technology, including but not limited to Ethernet, WiFi, 3G, 4G, LTE, and the Internet. In some embodiments, the model training system 200 and the recommendation system 250 may be provided by a single, combined system.

As illustrated, the model training system 200 includes a data ingestion engine 202, a feature recognition engine 204, a model training engine 206, a training data store 208, and a model data store 210.

In some embodiments, the data ingestion engine 202 is configured to obtain face images and tagging information from which training data can be generated. The face images and tagging information may be stored in by the data ingestion engine 202 in the training data store 208. In some embodiments, the data ingestion engine 202 may receive content from one or more social networking systems 212, including but not limited to Instagram, Twitter, and Pinterest. Social media posts on such systems may include face images along with textual information describing what is depicted in the face image. The textual information, which may or may not include semantically demarcated content such as hashtags, may specifically identify one or more products depicted in the face image. In some embodiments, the data ingestion engine 202 may similarly retrieve information from web sites such as blogs, wherein the blog posts may include face images and textual information describing the depicted products. In some embodiments, the data ingestion engine 202 may be configured to extract face image information from video information posted to a social networking system 212, and may be configured to extract the textual information from the video information using a speech-to-text conversion technique.

In some embodiments, the data ingestion engine 202 may be configured to receive information from a lab test system 214. The lab test system 214 may generate face images that depict products applied to test subjects or test apparatuses intended to replicate actual facial features, and may provide such face images to the data ingestion engine 202 along with information identifying the products depicted. In some embodiments, the lab test system 214 may also provide specific information describing the products, including but not limited to specular measurement information and color measurement information.

In some embodiments, the feature recognition engine 204 may be configured to extract portions of face images that depict specific facial features. For example, the feature recognition engine 204 may receive a face image, and may extract a portion of the face image that depicts an eye, lips, a cheek, an eyebrow, or any other facial feature. In some embodiments, the feature recognition engine 204 may extract the portion of the face image by creating a new, smaller image that includes just the detected facial feature. In some embodiments, the feature recognition engine 204 may extract the portion of the face image by providing coordinates within the original face image that locate the detected facial feature. The portions of the face image may be stored in the training data store 208 along with the associated tagging information.

In some embodiments, the model training engine 206 may be configured to use the training data stored in the training data store 208 to train one or more machine learning models that can identify products in a portion of a face image. In some embodiments, the model training engine 206 may generate a separate machine learning model for each facial feature to be processed. Once created, the machine learning models may be stored in the model data store 210.

As illustrated, the recommendation system 250 includes a feature recognition engine 252, a product detection engine 254, a product recommendation engine 256, a model data store 258, and a look data store 260. In some embodiments, the feature recognition engine 252 is similar to the feature recognition engine 204 of the model training system 206, at least in that it may be configured to extract portions of face images that depict specific facial features. In some embodiments, the product detection engine 254 may be configured to receive portions of face images extracted by the feature recognition engine 252, and then to use machine learning models stored in the model data store 258 to identify products depicted in the portions of the face images. In some embodiments, the product detection engine 254 may then store the identified products together as a look in the look data store 260. In some embodiments, the product recommendation engine 256 may receive the products identified by the product detection engine 254, and analyze looks in the look data store 260 to determine one or more other products to recommend based on the identified products.

Further details of the functionality of the model training system 200, the recommendation system 250, and the components thereof are provided below.

In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Figure 3A:
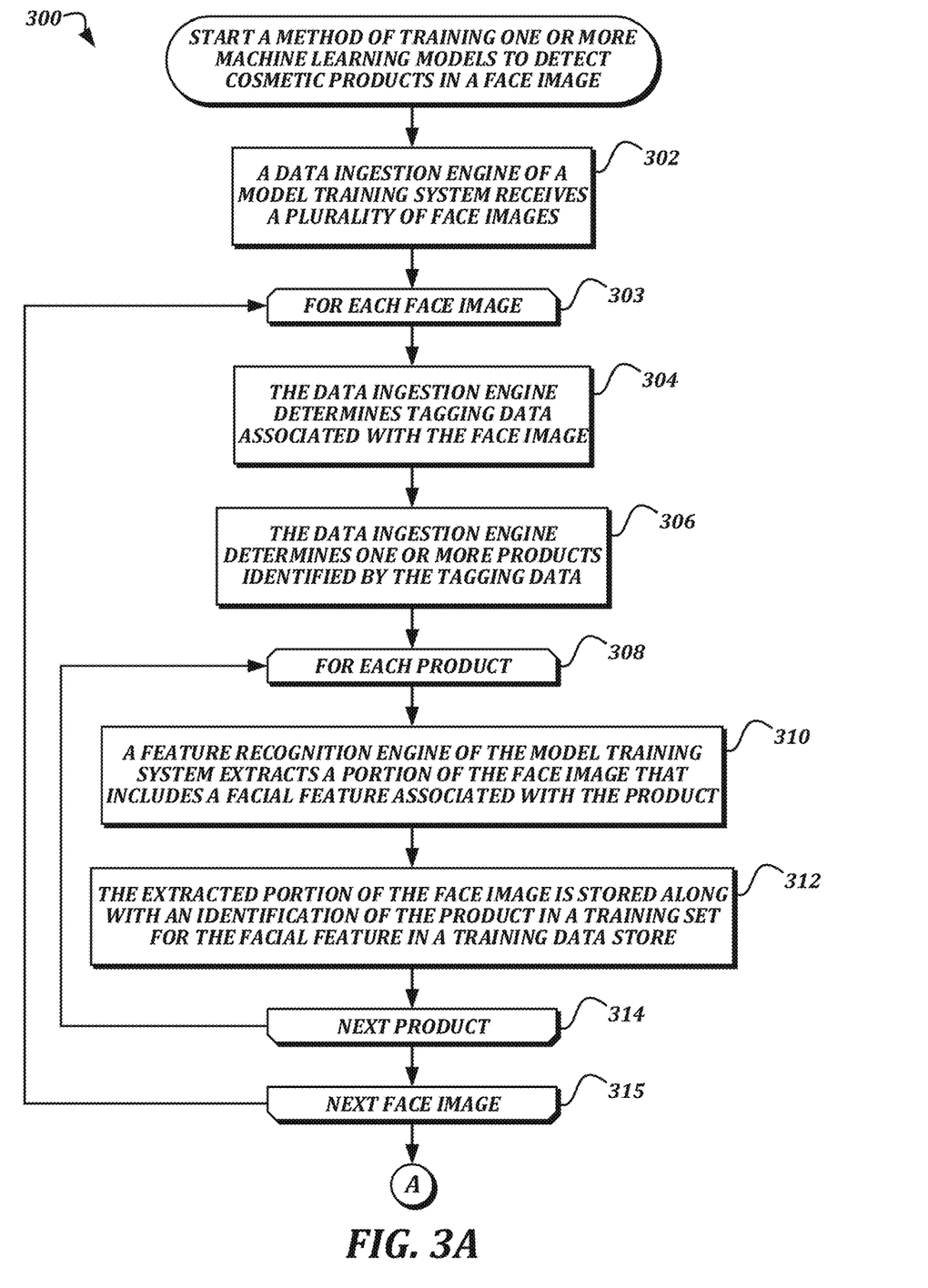
FIGS. 3A-3B are a flowchart that illustrates an example embodiment of a method of training one or more machine learning models to detect cosmetic products in a face image according to various aspects of the present disclosure.
Figure 3B:
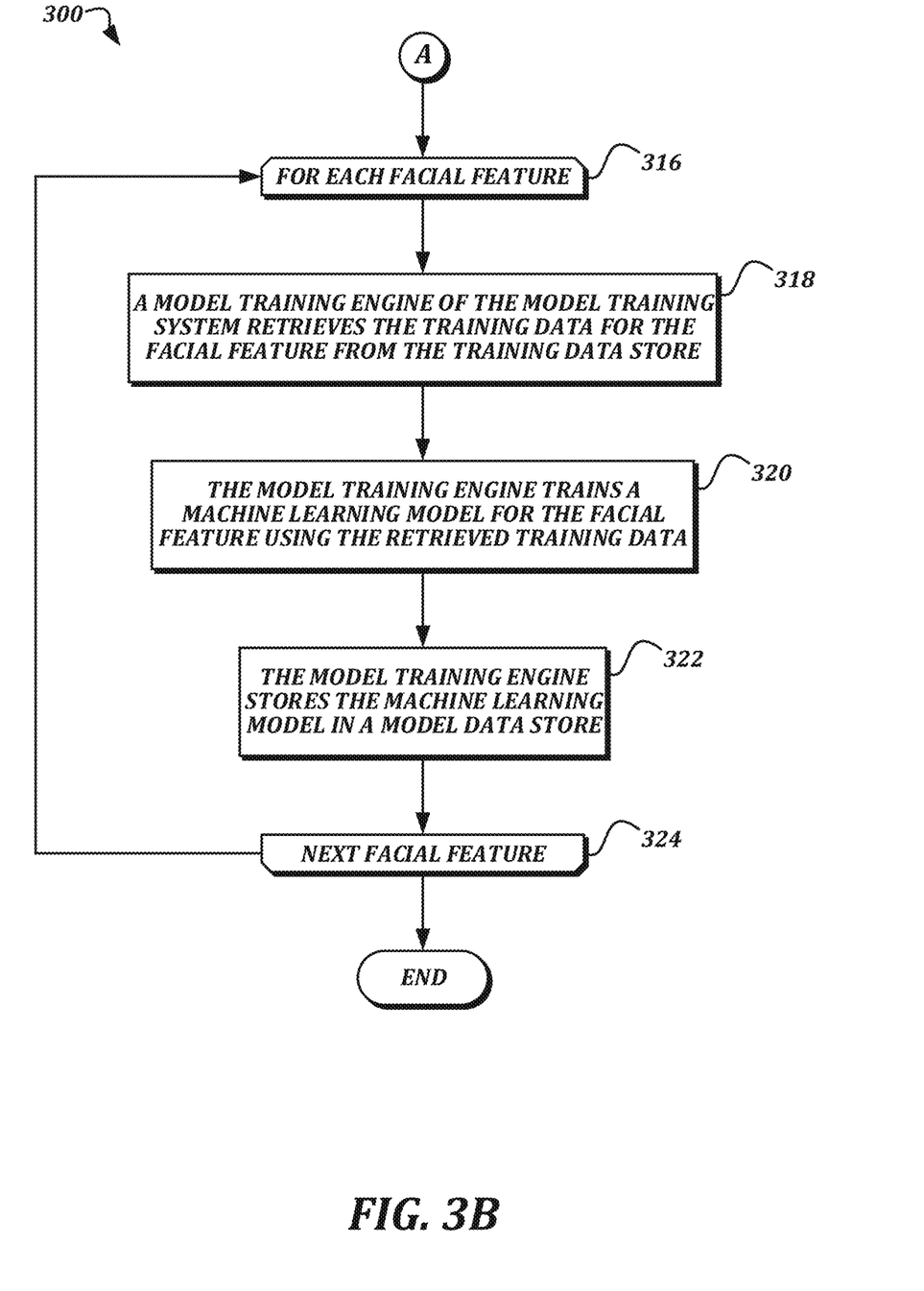

FIGS. 3A-3B are a flowchart that illustrates an example embodiment of a method of training one or more machine learning models to detect cosmetic products in a face image according to various aspects of the present disclosure. From a start block, the method 300 proceeds to block 302, where a data ingestion engine 202 of a model training system 200 receives a plurality of face images. The data ingestion engine 202 may receive the plurality of face images from any source. For example, in some embodiments, the data ingestion engine 202 may retrieve the plurality of face images from a social networking system 212, such as by requesting social media posts from the social networking system 212 that include a particular hashtag. In some embodiments, the data ingestion engine 202 may receive face images from end user computing devices such as tablets, smartphones, or camera-enabled laptops or desktop computers, wherein software running on the end user computing device captures a face image using a camera of the end user computing device. In such embodiments, the software may also prompt the user to identify products being worn by the person depicted in the face image. In some embodiments, the plurality of face images could include training data generated by an operator of the model training system 200 from a data set such as a set of marketing materials or a set of lab-generated images. In some embodiments, the data ingestion engine 202 may save the ingested face images in the training data store 208, along with any accompanying information such as textual information from a social media post or tagging information collected by the software.

The method Q300 then proceeds to a for loop defined between a for loop start block 303 and a for loop end block 315, wherein each of the face images of the plurality of face images is processed. From the for loop start block 303, the method 300 proceeds to block 304, where the data ingestion engine 202 determines tagging data associated with the face image. In some embodiments, if the face image is associated with a social media post or other Internet content, the data ingestion engine 202 may review hashtags or other text associated with the face image to find textual identifications of brand names, product names, colors, textures, or finishes that can be used to identify the depicted products. In some embodiments, if a product package is visible in the face image, the data ingestion engine 202 may recognize text on the product package, may recognize the package compared to stored images of the package, or may analyze a bar code depicted on the package in order to determine the tagging data. In some embodiments, tagging data may be created for the face image by an operator and provided to the data ingestion engine 202.

Next, at block 306, the data ingestion engine 202 determines one or more products identified by the tagging data. In some embodiments, a product name, color, texture, and/or finish included in the tagging data may be associated by the data ingestion engine 202 may be associated with a stock keeping unit (SKU) that uniquely identifies the product. In some embodiments, the data ingestion engine 202 may cross-reference partial information within the tagging data (such as a product name and a color without a finish, or a product name alone) with lab test data obtained from the lab test system 214 in order to come up with a detailed identification of a particular product, color, finish, and texture depicted.

The method 300 then proceeds to another for loop defined between a for loop start block 308 and a for loop end block 314 wherein the face image is processed for each product identified in by the data ingestion engine 202. From the for loop start block 308, the method 300 proceeds to block 310, where a feature recognition engine 204 of the model training system 200 extracts a portion of the face image that includes a facial feature associated with the product. For example, if the product is a lipstick, then the feature recognition engine 204 extracts a portion of the face image that includes the lips of the face. As another example, if the product is an eyeshadow, eyeliner, or mascara, then the feature recognition engine 204 extracts a portion of the face image that includes at least one of the eyes of the face.

At block 312, the extracted portion of the face image is stored along with an identification of the product in a training set for the facial feature in a training data store 208. The method 300 then proceeds to the for loop end block 314. If any further products were identified, then the method 300 returns to the for loop start block 308 to process the next product. Otherwise, the method 300 proceeds to for loop end block 315. If further face images are to be processed, then the method 300 returns to the for loop start block 303 to process the next face image. Otherwise, the method 300 proceeds to a continuation terminal ("terminal A").

From terminal A (FIG. 3B), the method 300 proceeds to a for loop defined between a for loop start block 316 and a for loop end block 324 wherein a machine learning model is trained for each of the facial features (e.g., eyes, lips, cheeks) supported by the method 300. From the for loop start block 316, the method 300 proceeds to block 318, where a model training engine 206 of the model training system 200 retrieves the training data for the facial feature from the training data store 208. For example, if the facial feature is lips, then the model training engine 206 retrieves a plurality of portions of face images from the training data store 208 that include lips, along with the information identifying the products in the portion of the face images. At block 320, the model training engine 206 trains a machine learning model for the facial feature using the retrieved training data. Any suitable type of machine learning model, including but not limited to a convolutional neural network (CNN), may be used, as may any suitable technique for training the machine learning model, including but not limited to as gradient descent.

At block 322, the model training engine 206 stores the machine learning model in a model data store 210. The method 300 then proceeds to for loop end block 324. At the for loop end block 324, if more facial features are to be processed, the method 300 returns to block 316 to process the next facial feature. Otherwise, the method 300 proceeds to an end block and terminates.

Figure 4:
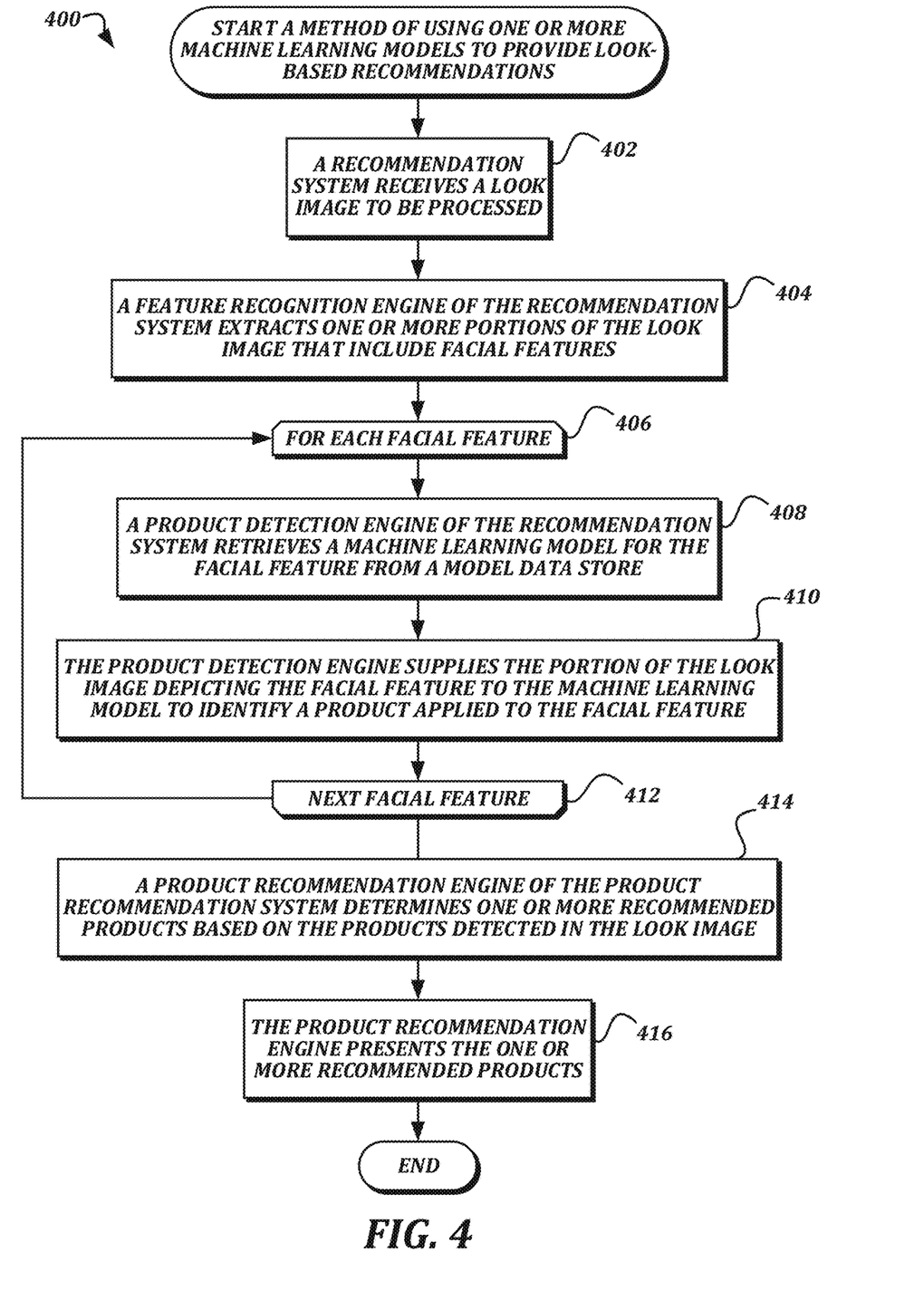
FIG. 4 is a flowchart that illustrates an example embodiment of a method of using one or more machine learning models to provide look-based recommendations according to various aspects of the present disclosure.

FIG. 4 is a flowchart that illustrates an example embodiment of a method of using one or more machine learning models to provide look-based recommendations according to various aspects of the present disclosure. In some embodiments, the method 400 may use a recommendation system 250 that has a model data store 258 that is pre-loaded with one or more machine learning models trained by the method 300 described above, and/or stored in the model data store 210 of the model training system 200.

From a start block, the method 400 proceeds to block 402, where a recommendation system 250 receives a look image to be processed. The look image may be received in a manner similar to the face images gathered by the data ingestion engine 202 as described above, in that the look image may be received from a social networking system 212, or software executing on an end user computing device. In some embodiments, the look image may be provided to the recommendation system 250 by tagging the look image with a particular hashtag or identifier associated with the recommendation system 250 on the social networking system 212. The look image may depict a face, and may include one or more products that can be detected by the machine learning models.

At block 404, a feature recognition engine 252 of the recommendation system 250 extracts one or more portions of the look image that include facial features. The feature recognition engine 252 may extract portions of the look image that correspond to the facial features for which machine learning models have been trained by the model training system 200, and may be extracted using techniques similar to those discussed above with respect to the feature recognition engine 204.

The method 400 then advances to a for loop defined between a for loop start block 406 and a for loop end block 412, wherein each extracted facial feature is processed to identify products depicted therein. From the for loop start block 406, the method 400 proceeds to block 408, where a product detection engine 254 of the recommendation system retrieves a machine learning model for the facial feature from a model data store 258. For example, if the facial feature is lips, the product detection engine 254 retrieves the machine learning model from the model data store 258 that has been trained to detect products on lips. Next, at block 410, the product detection engine 254 supplies the portion of the look image depicting the facial feature to the machine learning model to identify a product applied to the facial feature. In some embodiments, the output of the machine learning model may include an identification of a product, a color, a texture, and/or a finish. In some embodiments, the output of the machine learning model may also include a confidence score regarding how likely it is that the identification of the product is accurate.

The method 400 then proceeds to the for loop end block 412. If further facial features remain to be processed, then the method 400 returns to the for loop start block 406 to process the next facial feature. Otherwise, if all facial features have been processed, then the method 400 proceeds to block 414, where a product recommendation engine 256 of the product recommendation system 250 determines one or more recommended products based on the products detected in the look image. In some embodiments, the one or more recommended products may be determined by finding at least one look in the look data store 260 that is recommended based on the products detected in the look image, and recommending products from the recommended look.

To find the at least one recommended look, in some embodiments the product recommendation engine 256 may consult the look data store 260 to find other looks that match some aspect of the products detected in the look image. For example, the product recommendation engine 256 may search for stored looks that include at least one product that matches a product detected in the look image and at least one product that was not detected in the look image. As another example, the product recommendation engine 256 may search for stored looks that include products with at least one matching or complementary color or finish when compared to the products in the look image. In some embodiments, the product recommendation engine 256 may perform a clustering analysis on looks in the look data store 260 to determine types of looks that are similar, and may find the recommended look within a cluster to which the combination of products in the look image would be assigned. Once at least one recommended look is determined based on the detected products, the products included in the recommended looks can be used as the recommended products.

Once the recommended products are determined, at block 416, the product recommendation engine 256 presents the one or more recommended products. In some embodiments, the product recommendation engine 256 may present the products themselves. In some embodiments, the product recommendation engine 256 may present an image associated with the recommended look along with the identifications of the recommended products. In some embodiments, the presentation may be provided within the software used to interact with the recommendation system 250. In some embodiments, the presentation may be provided within another channel, such as an email or targeted web site content. In some embodiments, feedback regarding the recommended look and/or products may be accepted by the software, and used to improve future recommendations.

The method 400 then proceeds to an end block and terminates.

The above method 400 primarily describes using the machine learning models to detect products, and then to use those detected products to find similar looks. In some embodiments, the machine learning models could also be used to detect products in publicly available pictures, and then to add new looks to look data store 260 based on those pictures. In some embodiments, looks added to the look data store 260 in this manner may be augmented using sentiment analysis of content associated with the pictures, such as social media text/engagements, comments on articles or blog posts, and so on, in order to rank a quality of the look for use in future recommendations.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of using one or more machine learning models to process face images, the method comprising:
   using, by a computing device, the one or more machine learning models to determine identities of one or more cosmetic products in a face image;
   determining, by the computing device, one or more recommended looks based on the identities of the one or more cosmetic products in the face image;
   determining, by the computing device, one or more cosmetic products associated with the one or more recommended looks; and
   presenting, by the computing device, the one or more recommended looks or the one or more cosmetic products to a user;
   wherein the determining one or more recommended looks based on the identities of the one or more cosmetic products in the face image includes:
     adding a new look that includes the identities of the one or more cosmetic products to a look data store;
     performing a cluster analysis on looks stored in the look data store; and
     determining the one or more recommended looks based on other looks included in a cluster with the new look.

2. The method of claim 1, wherein the one or more machine learning models include one or more convolutional neural networks.

3. The method of claim 1, wherein the face image is included in a social media post.

4. The method of claim 3, further comprising:
   determining, by the computing device, a look based on the determined identities of the one or more cosmetic products;
   determining, by the computing device, a sentiment score based on the social media post; and
   storing, by the computing device, the sentiment score and the look in a look data store.

5. The method of claim 1, wherein using the one or more machine learning models to determine the identities of the one or more cosmetic products in the face image includes:
  extracting a portion of the face image associated with a predetermined facial feature; and
  providing the portion of the face image to a machine learning model trained to determine identities of cosmetic products applied to the predetermined facial feature.

6. The method of claim 5, wherein the predetermined facial feature is an eye, lips, a forehead, a cheekbone, or a nose.

7. The method of claim 1, wherein determining the one or more recommended looks based on the identities of the one or more cosmetic products in the face image includes:
  determining one or more looks that include at least one cosmetic product with a color or a texture that matches a color or a texture of the identified one or more cosmetic products in the face image, and at least one product that does not match the color or the texture of the identified one or more cosmetic products in the face image.

8. The method of claim 1, wherein the one or more machine learning models are trained by:
  extracting, by a training computing device, a training face image from a training social media post;
  determining, by the training computing device, an identity of a product present in the training face image based on non-image data by performing actions including examining text associated with the training social media post outside of the training face image and determining the identity of the product based on the text;
  extracting, by the training computing device, a portion of the training face image that includes a facial feature associated with the product;
  adding, by the training computing device, the portion of the training face image and the identity of the product to a training data set; and
  training, by the training computing device, the machine learning model to identify the product in face images using the training data set.

9. The method of claim 8, wherein the text associated with the training social media post outside of the training face image includes semantically demarcated content.

10. The method of claim 9, wherein the semantically demarcated content is a hashtag.

11. A system for using one or more machine learning models to process face images, the system comprising:
  circuitry for using the one or more machine learning models to determine identities of one or more cosmetic products in a face image;
  circuitry for determining one or more recommended looks based on the identities of the one or more cosmetic products in the face image;
  circuitry for determining one or more cosmetic products associated with the one or more recommended looks; and
  circuitry for presenting the one or more recommended looks or the one or more cosmetic products to a user;
  wherein the determining one or more recommended looks based on the identities of the one or more cosmetic products in the face image includes:
    adding a new look that includes the identities of the one or more cosmetic products to a look data store;
    performing a cluster analysis on looks stored in the look data store; and
    determining the one or more recommended looks based on other looks included in a cluster with the new look.

12. The system of claim 11, wherein the one or more machine learning models include one or more convolutional neural networks.

13. The system of claim 11, wherein the face image is included in a social media post.

14. The system of claim 13, further comprising:
  circuitry for determining a look based on the determined identities of the one or more cosmetic products;
  circuitry for determining a sentiment score based on the social media post; and
  circuitry for storing the sentiment score and the look in a look data store.

15. The system of claim 11, wherein using the one or more machine learning models to determine the identities of the one or more cosmetic products in the face image includes:
  extracting a portion of the face image associated with a predetermined facial feature; and
  providing the portion of the face image to a machine learning model trained to determine identities of cosmetic products applied to the predetermined facial feature.

16. The system of claim 11, wherein determining the one or more recommended looks based on the identities of the one or more cosmetic products in the face image includes:
  determining one or more looks that include at least one cosmetic product with a color or a texture that matches a color or a texture of the identified one or more cosmetic products in the face image, and at least one product that does not match the color or the texture of the identified one or more cosmetic products in the face image.

17. The system of claim 11, wherein the one or more machine learning models are trained by:
  extracting, by a training computing device, a training face image from a training social media post;
  determining, by the training computing device, an identity of a product present in the training face image based on non-image data by performing actions including examining text associated with the training social media post outside of the training face image and determining the identity of the product based on the text;
  extracting, by the training computing device, a portion of the training face image that includes a facial feature associated with the product;
  adding, by the training computing device, the portion of the training face image and the identity of the product to a training data set; and
  training, by the training computing device, the machine learning model to identify the product in face images using the training data set.

18. The system of claim 17, wherein the text associated with the training social media post outside of the training face image includes semantically demarcated content.

19. A method of using one or more machine learning models to process face images, the method comprising:
  using, by a computing device, the one or more machine learning models to determine identities of one or more cosmetic products in a face image;
  determining, by the computing device, one or more recommended looks based on the identities of the one or more cosmetic products in the face image;
  determining, by the computing device, one or more cosmetic products associated with the one or more recommended looks; and presenting, by the computing device, the one or more recommended looks or the one or more cosmetic products to a user;
wherein the face image is included in a social media post; and
wherein the method further comprises:
  determining, by the computing device, a look based on the determined identities of the one or more cosmetic products;
  determining, by the computing device, a sentiment score based on the social media post; and
  storing, by the computing device, the sentiment score and the look in a look data store.

\* \* \* \* \*